US006936983B2

(12) United States Patent
Kachouh et al.

(10) Patent No.: US 6,936,983 B2
(45) Date of Patent: Aug. 30, 2005

(54) MOTOR VEHICLE DOOR LOCK WITH AN ELECTROMECHANICAL CENTRAL LOCKING SYSTEM DRIVE

(75) Inventors: Checrallah Kachouh, Dortmund (DE); Peter Bartel, Hattingen (DE); Ingmar Hentsch, Wuppertal (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 0 days.

(21) Appl. No.: 10/456,902

(22) Filed: Jun. 9, 2003

(65) Prior Publication Data

US 2004/0012352 A1 Jan. 22, 2004

(30) Foreign Application Priority Data

Jun. 12, 2002 (DE) ........................................ 102 26 190
Jul. 16, 2002 (DE) ........................................ 102 32 280

(51) Int. Cl.[7] ................................................ H02P 5/00
(52) U.S. Cl. ....................... 318/272; 318/282; 318/286; 292/201; 307/10.2
(58) Field of Search ................................ 318/280, 283, 318/286, 282, 602, 603, 266, 466; 307/10.1, 10.2; 49/26, 280; 701/45; 292/201, 216; 70/257; 74/89.25

(56) References Cited

U.S. PATENT DOCUMENTS 4,793,640 A * 12/1988 Stewart, Sr. ................ 292/201
4,926,332 A * 5/1990 Komuro et al. ............... 701/36

(Continued)

FOREIGN PATENT DOCUMENTS

| | | | |
|---|---|---|---|
| DE | 4439 479 | A1 | 5/1996 |
| DE | 198 19 611 | A1 | 11/1999 |
| DE | 199 00 309 | C2 | 5/2000 |
| DE | 199 44 964 | A1 | 3/2001 |
| DE | 100 06 765 | A1 | 8/2001 |
| DE | 100 32 664 | A1 | 1/2002 |

OTHER PUBLICATIONS

Tietze, Schenk, Semiconductor Circuitry, 10th Edition, Springer, Berlin, 1993, Chapter 18, Power Supply, Chapter 18.3, Linear Voltage Regulators, pp. 542–555.

Tietze, Schenk, Semiconductor Circuitry, 10th Edition, Springer, Berlin, 1993, Chapter 27 Electronic Controllers, pp. 940–949.

*Primary Examiner*—Paul Ip
(74) *Attorney, Agent, or Firm*—Nixon Peabody LLP; David S. Safran

(57) ABSTRACT

A motor vehicle door lock with an electromechanical central locking system drive (1) and a mechanical central locking system element (2) driven by it, the central locking system drive (1) having an electric drive motor (3) and a motor control (5) with a motor state sensor (6). The central locking system element (2) can be moved by the central locking system drive (1) at least into a locked position and the motor control (5) is designed such that it triggers the electric drive motor (3) for driving the central locking system element (2) into the locked position after receiving an actuation signal from an actuation unit, such as a closing cylinder, a locking button, a remote control receiving unit or a handle (inside door handle, outside door handle). Preferably, the motor control 5 is also designed such that it automatically triggers the electric drive motor (3) for driving the central locking system element (2) into the locked position as soon as a certain operating state of the motor vehicle has been reached. Furthermore, significantly, the motor control (5) has a control circuit that includes the motor state sensor (6) and this control circuit is designed such that, when the electric drive motor (3) is triggered, the electric drive motor (3) runs with a low rpm that is controlled using the signal of the motor state sensor (6).

20 Claims, 1 Drawing Sheet

U.S. PATENT DOCUMENTS

| | | | | | |
|---|---|---|---|---|---|
| 5,004,931 | A | * | 4/1991 | Chen | 307/10.2 |
| 5,350,986 | A | * | 9/1994 | Long et al. | 318/432 |
| 5,396,158 | A | * | 3/1995 | Long et al. | 318/282 |
| 5,434,487 | A | * | 7/1995 | Long et al. | 318/286 |
| 5,614,769 | A | * | 3/1997 | Kuroda | 307/10.2 |
| 5,638,712 | A | * | 6/1997 | Kuroda | 70/268 |
| 5,673,578 | A | | 10/1997 | Roos | |
| 5,762,384 | A | * | 6/1998 | Bartel | 292/216 |
| 5,938,252 | A | * | 8/1999 | Uemura et al. | 292/201 |
| 6,133,646 | A | * | 10/2000 | Segawa et al. | 307/10.1 |
| 6,308,587 | B1 | * | 10/2001 | Shinkawa et al. | 74/89.25 |
| 6,341,448 | B1 | * | 1/2002 | Murray et al. | 49/280 |
| 6,371,536 | B1 | * | 4/2002 | Koerwer et al. | 292/201 |
| 6,519,987 | B1 | * | 2/2003 | Weyerstall | 70/257 |
| 6,557,910 | B2 | * | 5/2003 | Amano | 292/201 |
| 2001/0035654 | A1 | * | 11/2001 | Cetnar et al. | 292/201 |
| 2001/0050483 | A1 | | 12/2001 | Hanisch et al | |
| 2003/0127866 | A1 | * | 7/2003 | Martinez et al. | 292/216 |
| 2003/0171864 | A1 | * | 9/2003 | Mushiake et al. | 701/45 |
| 2003/0182863 | A1 | * | 10/2003 | Mejean et al. | 49/26 |
| 2004/0090122 | A1 | * | 5/2004 | Huber et al. | 307/10.2 |

* cited by examiner

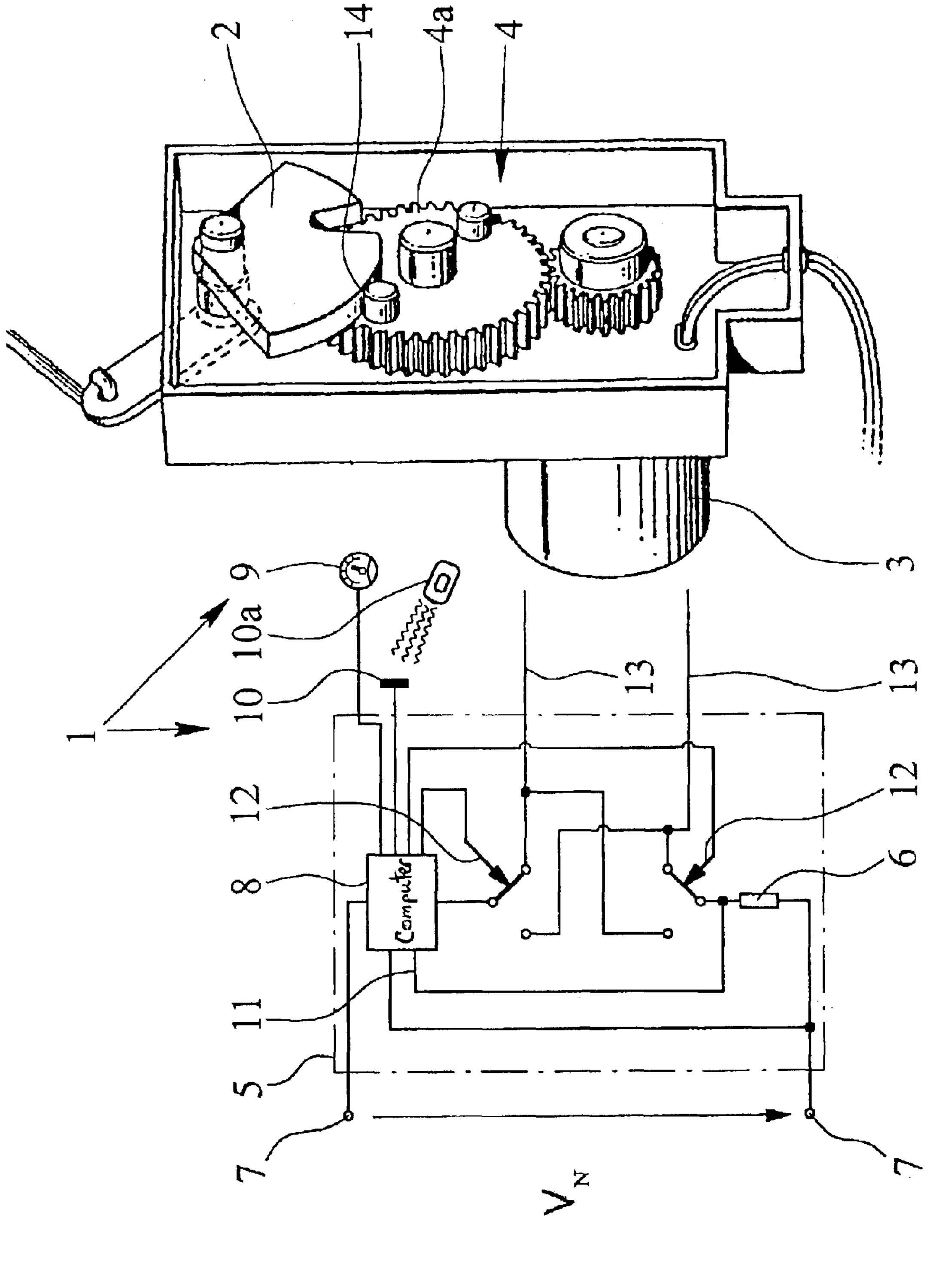
2
14
4a
4
3
1
10
10a
9
13
13
12
12
8
Computer
11
5
6
7
7
$V_N$

MOTOR VEHICLE DOOR LOCK WITH AN ELECTROMECHANICAL CENTRAL LOCKING SYSTEM DRIVE

BACKGROUND OF THE INVENTION

1. Field of the Invention

The invention relates to a motor vehicle door lock with an electromechanical central locking system drive.

2. Description of Related Art

A conventional motor vehicle door lock of the type under consideration, therefore the lock for a motor vehicle side door, a rear hatch or a rear door, but also for a sliding door of a motor vehicle, generally has locking elements, such as a latch and ratchet, and a lock mechanism with various levers which are used for actuation. In particular, reference can be made to the prior art (for example, published German Patent Application DE 100 06 765 A1 and corresponding U.S. Pat. No. 5,673,578).

Motor vehicle door locks with an electromechanical central locking system drive (for example, German Patent Application DE 100 06 765 A1 and corresponding U.S. Pat. No. 5,673,578) are common. It generally drives a mechanical central locking system element of the lock mechanism in order to move the motor vehicle door lock, overall, at least into a unlocked position, in which the motor vehicle door can be opened from the inside and outside, and into a locked position in which the motor vehicle door can be opened from the inside, but cannot be opened from the outside. Often, a third position is also set up, specifically an antitheft position, in which the motor vehicle door cannot be opened either from the outside or from the inside. Finally, on the rear side doors and on the rear doors, there can also be a child safety position in which the motor vehicle door can be opened from the outside, but not from the inside. The details in this respect are not important to the teaching of this invention, which relates to the control of the electromechanical central locking system drive.

The known motor vehicle door lock underlying the invention (German Patent Application DE 33 39 479 A1 and corresponding U.S. Pat. No. 5,673,578), first of all, has an electromechanical central locking system drive and a mechanical central locking system element driven by it, in the form of a central locking system drive lever. In this prior art, the central locking system drive encompasses an electric drive motor, a linkage with a gearwheel which forms the driven element, and driver journal which is located on the gearwheel and via which the central locking system element which is made as a pivot lever can be pivoted back and forth between two positions, the unlocked position and the locked position. The construction here is such that the central locking system element with the electric drive motor switched off is decoupled from the drive motor and can be mechanically moved free of resistance from one position into another, for example by actuating a closing cylinder.

This motor vehicle door lock has an electronic motor control. The latter encompasses a motor state sensor in the form of a motor current sensor which measures the current drawn by the electric drive motor. The motor control is designed such that it directly triggers or automatically triggers the electric drive motor for driving the central locking system element into the locking position either after receiving an actuation signal from an actuation unit such as a closing cylinder, a locking button, a remote control receiving unit or a handle (inside door handle, outside door handle), as soon as a certain operating state of the motor vehicle has been reached. The latter, of course, requires an actuation signal, which is not initiated by an operator, but it is automatically initiated when a certain operating state of the motor vehicle is reached. Such an operating state is, for example, a certain minimum speed of the motor vehicle after being parked beforehand. This function of the known motor vehicle door lock is used to protect passengers against hold-ups at traffic lights or the like. When the operator has climbed into the vehicle, has started the engine and has set off, all door locks of the motor vehicle are automatically locked when a minimum speed of the motor vehicle is exceeded and they remain locked until the operator climbs out again.

In the known motor vehicle door lock explained above, the motor control can do something else, for example it can turn off the electric drive motor when the locked position (or the unlocked position) is reached. Here it is provided specifically that to turn off the electric drive motor there is at least one stop which blocks further rotation of the electric drive motor. The motor control is designed such that the electric drive motor is turned off at least when the locked position is reached according to the signal of the motor state sensor. In the motor current sensor which is known in the prior art, this means that the power consumption of the electric drive motor is monitored and the electric drive motor is turned off when a certain boundary value of the motor current is exceeded beyond a certain time. This is evaluated in the motor control as blocking of the motor by the central locking system element or the stop, then the electric drive motor is turned off. This is called blocking operation of the electric drive motor. This makes it possible to abandon microswitches which sense certain positions of the electric drive motor of the step-down gearing, generally downstream of it and/or of the mechanical central locking system element. This saves money and reduces fault susceptibility of the motor vehicle door lock.

In practice, it has been shown that in motor vehicle door locks with electromechanical central locking system drives with automatic locking as a result of reaching a defined operating state of the motor vehicle, the noise of the central locking system drive when being turned off is perceived as disturbing. This applies when the turning-off takes place by means of microswitches because the lock mechanism is also stopped suddenly in this case. This applies to a special degree in blocking operation of the electric drive motor because a mechanical element strikes a stop in some form and is thus stopped.

Very similar disturbing noise occurs when the electric drive motor, after receiving an actuation signal from the actuation unit, is to a certain extent deliberately stopped by the operator. However, in this case, this noise is perceived as less disturbing because the operator is more or less prepared for it.

SUMMARY OF THE INVENTION

A primary object of the present invention is to improve the motor vehicle door lock explained in detail above with respect to noise formation.

The aforementioned object is achieved by a motor vehicle door lock with a central locking system drive having an electric drive motor and a motor control with a motor state sensor, and a central locking system element that can be moved by the central locking system drive at least into a locked position and the motor control being designed such that it triggers the electric drive motor for driving the central locking system element into the locked position after receiving an actuation signal from an actuation unit, such as a closing cylinder, a locking button, a remote control receiving unit or a handle (inside door handle, outside door handle), by the motor control having a control circuit which includes the motor state sensor and that is designed such that, when the electric drive motor is triggered, the electric drive motor runs with low rpm and is controlled using the signal of the motor state sensor to these rpm.

The motor control which is present anyway is used in accordance with the invention to control the rpm of the electric drive motor. Thus, it is possible to have the electric drive motor, as a whole, run much more slowly than previously conventional. A more slowly running electric drive motor does lead to slower reaction of the mechanisms of the motor vehicle door lock, but enjoys a series of major advantages. First, there is optimum rpm matching over the entire path of motion of the central locking system element. Unnecessarily high acceleration forces are avoided on the levers of the lock mechanism. The slow running speed of the central locking system drive leads to a reduction of noise formation. The blocking operation of the electric drive motor can be easily integrated into the control circuit, and the blocking current can be additionally limited. In particular, in a digital control circuit this function can be accomplished essentially without additional cost, simply in the programming of a microcomputer.

A standard central locking system drive in a conventional motor vehicle is designed for the usual vehicle voltage, in Europe generally 12 V, but it must also work properly with a lower voltage, for example, 9 V at 85° C., but of course also with an overvoltage, for example, 16 V. Proper operation is defined as the counterforces which engage a lever apparatus moved by the central locking system drive as far as the inside safety button having to be overcome. In other words, this means that, in the normal case, the central locking system drive inherently works too quickly and powerfully and especially travels into the block.

The central locking system drive according to the invention is moved with a much lower voltage, for example, a voltage of 3 V. With this lower voltage, the central locking system drive, of course, does not have the torque necessary for overcoming additional counterforces. The control of the rpm of the electric drive motor provided in accordance with the invention now leads to the power supply voltage increasing in reaction to the load and when the load is removed, it is reduced again. Overall, the central locking system drive thus runs more slowly and less powerfully, but for this reason much more quietly.

The teaching of the invention is of special importance for automatic triggering of the electric drive motor for driving the central locking system element into the locked position as soon as a certain operating state of the motor vehicle has been reached, the control circuit being designed such that after reaching a certain operating state of the motor vehicle, the electric drive motor runs at an rpm which is much lower as compared to the normal triggering of the electric drive motor after receiving an actuating signal, and is controlled to these lower rpm using the signal of the motor state sensor. It is particularly useful when the certain operating state is a certain driving speed being reached after initial starting or restarting of the motor vehicle.

In this case, the slower reaction of the mechanism is not perceived as disturbing because, with automatic triggering of the electric drive motor, the operator does not perceive the passage of time anyway. That is, the operator perceives positively only that the motor vehicle door lock is working very quietly because the rpm is so low and therefore the inevitable impact noise is reduced to a minimum.

The above described control can always be activated. However, occasionally this can be a disadvantage because the slower reaction of the mechanism is perceived as disturbing. In this case, it can be provided that this control is only activated when the motor control automatically triggers the electric drive motor. When the electric drive motor is triggered after receiving an actuation signal, it remains in this case in the "classical," relatively noisy functioning of the motor vehicle door lock. This is perceived quite positively by the operator because he acquires an acoustic report with respect to the function of the motor vehicle door lock.

The control which has been described above for automatic actuation of the electric drive motor can also be selectively actuated when the electric drive motor is manually triggered from the interior of the motor vehicle, for example, with the locking button for general locking of the motor vehicle or with a locking button or the like for triggering the child safety. Within the motor vehicle, specifically also for manual triggering, the noise development of the motor vehicle door lock is perceived as stronger than from the outside. Accordingly, it is perceived as comfortable and pleasant even if, in this case, the operation of the central locking system drive is quiet.

For the invention described here, the use of a motor current sensor is recommended as the motor state sensor of the motor vehicle door lock, because such a motor current sensor for a direct current motor which is used conventionally in a motor vehicle constitutes an economical sensor element. Fundamentally, other sensors can also be used, for example, an rpm sensor (rotary transducer, pulse counter; magnetic or optical sensor).

A torque sensor (especially a mechanical-electrical sensor such as a strain gauge) would also be suitable solely for the shutoff function of the motor vehicle door lock.

Overall, circuits which are known from the prior art for these purposes, especially analog control circuits or digital control circuits, are suited for the configuration of the motor control in itself. For this purpose, reference should be made to the technical literature in this regard (see, for example, Tietze, Schenck *Semiconductor Circuitry,* 10th edition, Springer, Berlin, 1993, especially Chapter 18 "Power Supply", especially 18.3 "Linear Voltage Regulators, and Chapter 27 "Electronic Controllers"). Embodiments are explained in the special part of the specification (description of the figures).

The invention is explained in detail below with reference to the accompanying drawings which show a preferred embodiment.

BRIEF DESCRIPTION OF THE DRAWINGS

In the drawings, the sole FIGURE shows the operating principle of the invention in the manner of an operating diagram.

DETAILED DESCRIPTION OF THE INVENTION

Some explanations to which reference should be made here can be found in the Background part of the specification pertaining to the basic structure of a motor vehicle door lock with a central locking system drive, to which the teaching of this invention relates.

The teaching of the invention relates to a motor vehicle door lock with an electromechanical central locking system drive 1 and a mechanical central locking system element 2 which is driven by it. In the embodiment shown in the FIGURE, the central locking system drive 1 has an electric drive motor 3 which drives the mechanical central locking system element 2, which is made here as a pivot lever, via a step-down gear, which is made here as toothed gearing 4. There are a host of other structures for electric drive motors 3 with step-down gearing 4, for example, a worm gear pair, spur/bevel wheel gear, and partially coupled to it, spindle/spindle nut gear. Reference should be made to the prior art in this regard, which provides a host of alternatives here.

Furthermore, an important prerequisite for the invention is that the central locking system drive 1 has a motor control 5. The motor control 5 in the FIGURE is connected to the DC voltage of the vehicle electrical network $V_N$ as represented at the power supply terminals 7 on the left, and also controls the turning on and off of the rpm of the electric drive motor 3, according to the invention. Part of the motor control is a motor state sensor 6. It is made, in this example, as a motor current sensor, specifically as a sensor resistor.

The central locking system element 2 can be moved at least in the locked position shown in the FIGURE by the central locking system drive 1; in this embodiment, by a gear wheel 4*a* of the step-down gearing 4. Basically, it is possible to have the central locking system drive 1 operate in one direction and even operate such that only the locked position is ever started by the central locking system drive 1. The unlocked position could then be only mechanically started. Normally, it is such that the central locking system drive 1 moves the central locking system element 2 not only into the locked position, but also in the unlocked position, in any case, for motor vehicle door locks which are not activated directly by a handle. This embodiment shows such a reversibly operating central locking system drive 1.

Finally, there are central locking system drives which can actuate three positions, specifically, the unlocked position, the locked position, and the antitheft position, likewise also a child safety position. However, it is only of importance for the invention that the central locking system drive 1 can actuate at least the locked position.

The motor control 5 is designed such that it triggers the electric drive motor 3 for driving the central locking system element 2 into the locked position after receiving an actuating signal from an actuation unit, such as a closing cylinder, a locking button, a remote control receiving unit (outside door handle, inside door handle). Furthermore, the motor control 5 is designed such that it also automatically triggers the electric drive motor 3 as soon as a certain operating state of the motor vehicle has been reached. A certain operating state can be defined, for example, as the state in which airbag sensors have established individuals in all places in the vehicle. In particular, reaching a certain driving speed after one-time or repeated starting of the motor vehicle is defined as one such certain operating state. This is a function which modern motor vehicle door locks increasingly have for reasons of safety, protection from hold-ups at traffic lights or the like.

Often nowadays, a motor control 5 is implemented in an integrated circuit, especially a microcomputer, so that the design of the motor control 5 means essentially its suitable programming.

The FIGURE shows that the motor control 5 has a control circuit including the motor state sensor 6 and this control circuit is designed such that when the electric drive motor 3 is triggered, the electric drive motor 3 runs with a low rpm and is controlled using the signal of the motor state sensor 6 to this rpm. In particular, reference should be made here to the above described explanation of the preferred construction and the control circuit in the Summary of the Invention portion of this application.

It is especially preferable, and in this embodiment it is also implemented, that the control circuit is designed such that, with automatic triggering of the electric drive motor 3 after reaching a certain operating state of the motor vehicle, especially a certain driving speed of the motor vehicle, the electric drive motor 3 runs at an rpm which that is significantly reduced as compared to the normal triggering of the electric drive motor 3 after receiving an actuating signal, and that the motor is controlled to these lower rpm using the signal of the motor state sensor.

The motor control 5 shows the microcomputer 8 which centrally organizes all control functions of the motor control 5. On the input side, on the one hand, a speed sensor 9 for determining the respective vehicle speed, on the other hand, at least one actuating sensor 10 for detecting an actuation signal by the actuating unit as explained above, here shown as a radio remote control 10*a*, are connected to the microcomputer 8. The microcomputer 8, therefore, on the one hand, receives an input signal which allows the microcomputer 8 to ascertain that a certain operating state of the motor vehicle has been reached, in this embodiment that a certain driving speed of the vehicle has been reached, and on the other hand, an actuation signal which indicates active actuation by an operator.

In this connection, it should also be pointed out that reducing the rpm of the electric drive motor 3 of the central locking system drive 1 can also be practical or can be perceived as pleasant with manual triggering from the interior of the motor vehicle, for example, when the inside locking button or the actuating means for the child safety on the rear side doors is actuated. This has already been addressed above.

Furthermore, the microcomputer 8 has a measurement input 11, which is connected to the motor state sensor 6, here the motor current sensor (resistor).

The outputs of the microcomputer 8 are connected to two motor changeover switches 12 which make it possible to drive the electric drive motor 3 in two directions of rotation. By reversing the polarity of the terminals 13 of the electric drive motor 3 by means of the motor changeover switch 12, one direction of rotation or the other can be stipulated, or when the motor changeover switches 12 are connected opposite one another, a short circuit of the terminals 13 for purposes of high-speed braking of the electric drive motor 3 can be induced. If there is one electric drive motor 3 with only one direction of rotation, these motor changeover switches are of course not required, and a normal on/off switch can be used.

It goes without saying that the motor changeover switches 12 will preferably be electronic switches (for example, transistor or thyristor switches), as can also be integrated into the overall circuit arrangement of the microcomputer 8 or on a corresponding board. Basically of course, electromechanical switches cannot be connected.

The use of the control circuit of the motor control 5, here, by means of the microcomputer 8, makes it possible to control the electric drive motor 3 with automatic triggering, for example, as a result of the signal of the speed sensor 9, to an rpm which is minimum with respect to the instantaneous operating states. In this embodiment, the microcomputer 8 is programmed such that this takes place basically only with automatic triggering, although it would also be fundamentally possible quite generally to operate the electric drive motor 3 accordingly rpm-controlled.

Basically, it would be possible to directly detect the rpm of the electric drive motor 3, for example, by means of a rpm sensor on the driven shaft of the electric drive motor 3. These sensors are known from the prior art as rotary transducers, pulse counters, etc. In particular, optoelectronic rpm sensors are also available. In any case, this embodiment shows a motor current sensor as a motor state sensor 6, an especially economical and reliable approach.

In the operating state described here, the central locking system drive 1 will be run with minimum rpm from the starting point to the end stop of the locked position, shown in the FIGURE. Rpm changes of the electric drive motor 3 which occur during this motion, due to fluctuations of the torque which is to be applied by the electric drive motor 3, are equalized by the microcomputer 8 by controlling the power supply voltage of the electric drive motor 3. If the torque on the driven shaft of the electric drive motor 3 increases, the current drawn by the electric drive motor 3 increases. The voltage drop on the internal resistor of the electric drive motor 3 increases, the induced voltage drops and the rpm of the electric drive motor 3 drops back. Accordingly, the reaction is the reverse when the torque which is to be applied by the electric drive motor 3 is reduced.

The circuit shown in the FIGURE ascertains, via the motor state sensor 6 in the form of a measurement resistor, the voltage drop which is proportional to the motor current and which is evaluated by the microcomputer 8. If the voltage drop increases, the microcomputer accordingly raises the power supply voltage of the electric drive motor 3 until the desired rpm of the electric drive motor 6 has been reached again.

In this way, the rpm of the electric drive motor 3 can be reduced to near the minimum possible rpm which, of course, should always be reached, so that the electric drive motor 3 in the meantime does not stop suddenly and hang up. This results in the displacement of the central locking system element 2 with automatic triggering of the electric drive motor 3 taking place as slowly as possible. In this way, the noise development of the central locking system drive 3 with the central locking system element 2 is minimized. The operator who is sitting in the vehicle does not acoustically notice after the vehicle is started that the motor vehicle door locks are closing with the electromechanical central locking system. At least the operator sitting in the vehicle perceives the closing of the electromechanical central locking system as especially quiet. The corresponding also applies when locking takes place manually from the inside. Likewise, this also applies to unlocking from inside the vehicle.

Overall control can be exercised such that only actuations by the operator from the outside initiate the normal, acoustically intensive operating mode of the central locking system, but automatic triggering and triggering by actuation of the interior always result in the controlled operating mode of the central locking system.

In the normal case, therefore, for actuation by the operator and when the actuation signal is received by the actuating sensor 10, the microcomputer 8 can trigger the electric drive motor 3 with a higher rpm so that the noise development is greater. For the operator this means the desired acoustic report that his actuation has been successful.

This embodiment of the motor control 5 can also be used especially favorably when there is at least one stop 14 which blocks additional rotation of the electric drive motor 3 to turn off the electric drive motor 3. Here then, specifically, the motor control 5 can be designed such that the electric drive motor 3 is turned off at least when the locked position is reached according to the signal of the motor state sensor 6. Thus, without further cost, blocking operation of the central locking system drive 1 can be integrated by circuitry. In this embodiment, the stop 14 is itself specified by a stop surface on the central locking system element 2, against which a journal on the gear wheel 4*a* of the step-down gear 4 moves, as is shown in the FIGURE. This is a technology which is known from DE 44 39 479 A1, and corresponding U.S. Pat. No. 5,673,578 or also U.S. Pat. No. 4,793,640 A.

Examples of control circuits can be found in the technical literature, for example, in the Tietze, Schenck citation which is mentioned in the Background part of the specification.

What is claimed is:

1. Motor vehicle door lock, comprising:

an electromechanical central locking system drive and a mechanical central locking system element in driven connection with electromechanical central locking system drive, the central locking system drive having an electric drive motor and a motor control having a control circuit with a motor state sensor, wherein the central locking system drive comprises a means for moving the central locking system element at least into a locked position, and wherein the motor control comprises a means far triggering the electric drive motor for driving the central locking system element into the locked position after receiving an actuating signal from an actuation unit, wherein the control circuit comprises a means for causing the electric drive motor to run at an rpm which is a minimum possible rpm for a then existing instantaneous operating state in accordance with a signal of the motor state sensor; and wherein the motor control further comprises a means for automatically triggering the electric drive motor for driving the central locking system element into the locked position as soon as a predetermined operating state of the motor vehicle has been reached.

2. Motor vehicle door lock as claimed in claim 1, wherein the control circuit is adapted, upon automatic triggering of the electric drive motor by reaching of the predetermined operating state, to cause the electric drive motor to run at an rpm which is much less as compared to an rpm occurring upon normal triggering of the electric drive motor by the actuating signal from the actuation unit.

3. Motor vehicle door lock as claimed in claim 2, wherein the predetermined operating state is attainment of a preset driving speed after starting of the motor vehicle.

4. Motor vehicle door lock as claimed in claim 2, wherein the control circuit has means for controlling of the rpm of the electric drive motor only with automatic triggering of the electric drive motor and not during motion of the central locking system element due to said triggering of the electric drive motor by the actuating signal from the actuation unit.

5. Motor vehicle door lock as claimed in claim 4, further comprising means for activating the motor control by manual triggering from the interior of a motor vehicle passage compartment.

6. Motor vehicle door lock as claimed in claim 2, wherein control of the rpm is activated only with automatic triggering of the electric drive motor, control of the rpm of the electric drive motor not occurring during motion of the central locking system element when the electric drive motor is triggered after receiving an actuation signal.

7. Motor vehicle door lock as claimed in claim 6, further comprising means for activating the motor control by manual triggering from the interior of a motor vehicle passage compartment.

8. Motor vehicle door lock as claimed in claim 1, wherein the motor state sensor is a motor current sensor.

9. Motor vehicle door lock as claimed in claim 1, wherein the motor state sensor is a rpm sensor.

10. Motor vehicle door lock as claimed in claim 1, further comprising at least one stop positioned to block rotation of the electric drive motor to thereby turn off the electric drive motor and wherein the motor control is operative for turning off the electric drive motor in response to a signal from the motor state sensor which indicates that the locked position has been reached.

11. Motor vehicle door lock as claimed in claim 1, wherein the motor control composes a microcomputer.

12. Motor vehicle door lock as claimed in claim 1, wherein the actuation unit is one of a closing cylinder, a locking button, a remote control receiving unit, and a door handle.

13. Process for controlling the central locking system drive of a motor vehicle door lock which has an electric drive motor and a motor control with a motor state sensor, comprising the steps of:

triggering the electric drive motor by means of the motor control for driving the central locking system element into a locked position after receiving an actuating signal from an actuation unit, using the motor control for automatically triggering the electric drive motor for driving the central locking system drive into the locked position as soon as a predetermined operating state of the motor vehicle has been reached, and controlling the electric drive motor to operate at an rpm which is a minimum rpm for a then existing, instantaneous operating state by means of the motor control, the motor rpm being determined in accordance with a signal of a motor state sensor, when the electric drive motor is triggered.

14. Process as claimed in claim 13, comprising the step of generating the actuating signal by an actuation unit that is one of a closing cylinder, a locking button, a remote control receiving unit, and a door handle.

15. Process as claimed in claim 13, comprising using the signal of the motor state sensor to cause the electric drive motor to run at an rpm which is much less as compared to a rpm at which the motor is run upon a normal triggering of the electric drive motor after receiving the actuating signal from the actuation unit.

16. Process as claimed in claim 15, wherein control of the rpm is activated only with automatic triggering of the electric drive motor, control of the rpm of the electric drive motor not occurring during motion of the central locking system element when the electric drive motor is triggered after receiving the actuating signal from the actuation unit.

17. Process as claimed in claim 15, wherein controlling of the electric drive motor is activated with manual triggering of the electric drive motor from the interior of the vehicle.

18. Process as claimed in claim 15, wherein controlling of the electric drive motor is activated with manual triggering of the electric drive motor from the interior of the vehicle.

19. Process as claimed in claim 13, wherein the predetermined operating state is attainment of a preset driving speed after starting of the motor vehicle.

20. Process as claimed in claim 19, wherein controlling of the rpm is activated only with automatic triggering of the electric drive motor, controlling of the rpm of the electric drive motor not occurring during motion of the central locking system element when the electric drive motor is triggered by the actuating signal from the actuation unit.

* * * * *